United States Patent [19]

Tillenburg

[11] 4,240,530
[45] Dec. 23, 1980

[54] BRAKE PAD FOR DISC BRAKES

[75] Inventor: Johannes Tillenburg, Essen, Fed. Rep. of Germany

[73] Assignee: Abex Pagid Reibbelag GmbH, Essen, Fed. Rep. of Germany

[21] Appl. No.: 35,360

[22] Filed: May 2, 1979

[30] Foreign Application Priority Data

May 13, 1978 [DE] Fed. Rep. of Germany ....... 2821194

[51] Int. Cl.³ .............................................. F16D 65/12
[52] U.S. Cl. ................................. 188/250 E; 188/1 B; 188/264 G
[58] Field of Search .................. 188/1 B, 73.5, 250 B, 188/250 E, 264 G

[56] References Cited

U.S. PATENT DOCUMENTS

| 3,162,271 | 12/1964 | Hanson | 188/264 G |
| 3,490,563 | 1/1970 | Hahm | 188/73.5 |

Primary Examiner—Duane A. Reger
Attorney, Agent, or Firm—Thomas S. Baker, Jr.; David A. Greenlee

[57] ABSTRACT

A brake pad has friction material bonded to a carrier plate. The carrier plate includes two strengthening parts, of which one is bonded to the friction material and the two are bonded together by a resilient bonding material. The two parts have a plurality of aligned recesses and projections to resist shear stresses encountered during braking.

3 Claims, 3 Drawing Figures

BRAKE PAD FOR DISC BRAKES

BACKGROUND OF THE INVENTION

This invention relates to a brake pad for a disc brake used in a motor vehicle. Such a brake pad customarily includes a composition friction lining which is rigidly attached to a metal carrier plate. The carrier plate strengthens the brake pad and enables it to withstand the large compressive stresses which are generated during the braking process when a piston biases the brake pad against a rotor or brake disc.

The aforementioned brake pad is economically manufactured in a single working step using a single press die as follows. The carrier plate is placed in the bottom of a mold. The surface of the carrier plate, which receives the friction lining, is coated with an adhesive film. Next, the friction lining composition is inserted in the mold. Finally, the press die presses the lining into the mold, which is maintained at a predetermined temperature until the friction material is properly shaped and cured. Simultaneously with the curing of the friction material, the adhesive is likewise cured and the friction material is bonded to the carrier plate.

During the braking process, when the friction lining engages the disc, vibrations occur which are transmitted through the brake pad and the piston to the brake housing or caliper. These vibrations can result in loud, high-pitched squeaking noises. Furthermore, friction between the disc and lining during the braking process generates large quantities of heat. Since friction linings have good heat conductivity, this heat is transmitted via the carrier plate to the brake piston and then to the brake fluid which results in impaired operability of the brake system. In the past, numerous attempts have been made to suppress the braking noises and the heat transfer.

One method of suppressing the brake noises is based on the principle that two bodies of different mass possess different characteristic frequencies, such that if the two bodies are bonded together and their masses are suitably matched, their vibration frequencies interfere with and impede one another in such a way as to dampen vibration. In accordance with this principle, a brake pad has been manufactured where a metallic carrier plate has a composition friction material on one side and a plastic or aluminum back plate which is bonded using a resin adhesive on the other side. Although good heat insulation can be achieved with the plastic back plate, the vibration damping is not effective.

It is also known to manufacture brake pads based on the principle of damping or absorbing vibration by interposing an elastic damping element between one surface which is vibrating and a second surface which is to be isolated from the vibration. According to this principle, a brake pad has been manufactured where the carrier plate is subdivided into two metal plates with a layer of an elastic, heat insulating material, such as rubber, interposed between the two plates. A problem with this type of pad is that it is extremely expensive to manufacture, and there is a significant reduction in the mechanical strength of the pad. A typical brake pad has a carrier plate which is approximately five millimeters thick. Consequently, even after the friction material has worn off the carrier plate, a portion of the carrier plate is retained in the brake housing during braking. In other words, a portion of the brake housing supports the carrier plate. However, in the case of a brake pad having a multi-layered plate of the type described above, also called a sandwiched lining, it is not desirable to increase the thickness of the carrier plate. This is because, if the carrier plate thickness is increased, the friction lining thickness must be decreased which results in shortening the working life of the pad. Consequently, the multi-part carrier plate must have a total thickness of approximately five milimeters. Each part of the carrier plate must be made two to three millimeters thick. However, after the friction lining has worn off, one part of the carrier plate is completely outside of the brake housing during braking. Only the second part is retained in the brake housing. As a result, the elastic bonding layer between the two parts is subjected to the high shear stress during braking. The layer cannot withstand the stress and one part of the carrier plate is displaced relative to the other, i.e., the part of the carrier plate which engages the disc and is out of the brake housing will be displaced relative to the other part. Under this condition, the part outside of the housing cannot retract into the housing after braking and the brake can no longer be released. In an extreme case, the protruding part of the carrier plate can lock the brake.

In another brake pad having a multi-part carrier plate, a relatively thin self-adhesive, plastic film has been used in place of rubber for the damping-elastic interlayer of the sandwich plate. This film is incapable of satisfactorily absorbing the above-described shear stresses and possesses the additional following disadvantages. If the parts of the carrier plate with the plastic film are placed in a mold in the manner initially described in order to simultaneously press the friction lining and bond the lining to the sandwich plate, the film softens and flows from between the parts of the carrier plate. This is because the plastic film is unable to withstand the temperature and pressure required to shape and cure the friction lining. It is possible to have friction lining first pressed onto one part of the carrier plate and the parts of the carrier plate subsequently bonded in a second die. However, this requires an additional working step which adds to the cost of the pad. Further, this requires an expensive die which accurately surrounds the parts of the carrier plate so that the metal plates are not mutually displaced when the film softens. Customarily, the finished pressed brake pads are ground to exact dimensions on their side faces and are then lacquered at an elevated temperature; in this procedure there is a risk of the film softening and the metal plates being mutually displaced.

In order to manufacture a brake pad which has a multi-part carrier plate in a single working step and which is capable of absorbing the shear forces generated during braking, a multi-part carrier plate has been made with a plurality of matching through bores and a layer of rubber interposed between the parts of the carrier plate. When the friction lining is pressed, the carrier plate bores are filled with lining composition which bonds the sandwiched layers of the carrier plate to one another in a method similar to rivets or bolts. A problem with this construction is that the rigid structures of the friction lining material which pass through the bores in the carrier plate prevent mutual displacement of the carrier plate parts, but also prevent free oscillation of the carrier plate parts relative to each other. Consequently, the rubber material interposed between the carrier plate parts cannot operate. The result is that the carrier plate operates as a one-piece unit.

In another brake pad having a multi-part carrier plate, recesses have been pressed into one part of the carrier plate and projections have been pressed into the other part of the carrier plate and the parts aligned such that the projections mate with the recesses. The mutually engaging projections and recesses enable the multi-part carrier plate to withstand the shear forces generated during braking and prevent displacement of the relative parts. However, as a result of the metal-to-metal contact of the projections and recesses, vibrations are transmitted between the parts of the carrier plate and the damping effect of the elastic layer interposed between the parts is adversely affected.

It is desired to provide a brake pad having a multi-part carrier plate in which a damping layer of resilient material is provided between the parts of the carrier plate and projections on one part of the carrier plate engage corresponding recesses in the other part of the carrier plate. However, the carrier plate must be constructed in such a way that the two parts of the carrier plate are isolated from one another and vibration in one of the parts cannot be transmitted to the other part directly.

It is also desired to provide a brake pad comprising a multi-part carrier plate which can be manufactured in a single working step, such that simultaneously with production of a multi-part sandwich carrier plate, the friction lining can be pressed onto the carrier plate.

SUMMARY OF THE INVENTION

The brake pad of the instant invention provides a multi-part carrier plate in which the parts have corresponding centering projections and recesses which mutually engage and have oblique centering surfaces. A thin, slightly compressible vibration damping and heat-insulating elastic bonding layer is interposed between the two parts of the carrier plate. The elastic bonding layer consists of a non-swellable material which, under the pressure and temperature of pressing and curing the friction lining, is permanently bonded to the parts of the carrier plate.

DESCRIPTION OF THE PREFERRED EMBODIMENT

Figure 1:
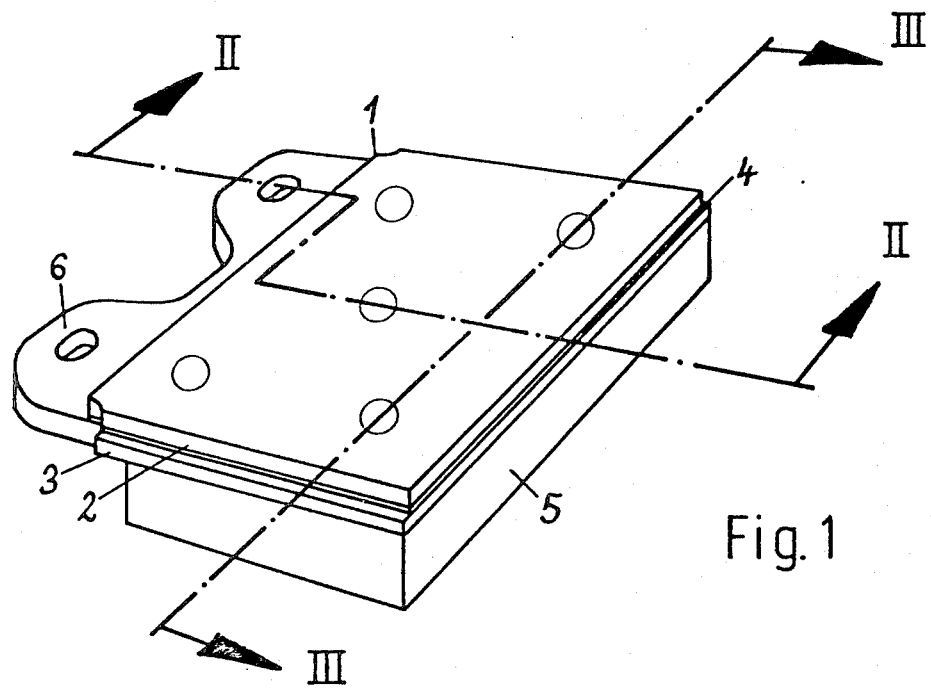
FIG. 1 shows a brake pad according to the instant invention.
Figure 2:
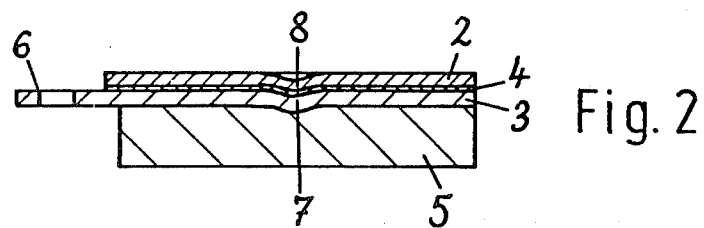
FIG. 2 is a sectional view along the line II—II of FIG. 1.
Figure 3:
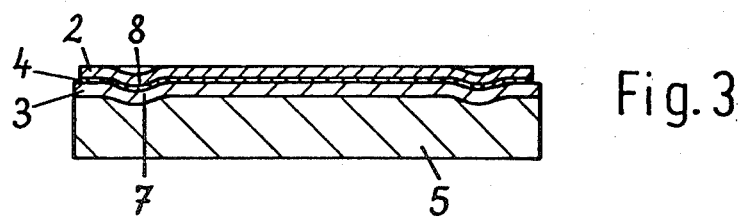
FIG. 3 is a sectional view along the lines III—III of FIG. 1.

Referring to FIGS. 1-3, the brake pad of the instant invention consists of a multi-part carrier plate 1 and a friction lining 5. The carrier plate 1 consists of two metal parts 2 and 3 which have a resilient bonding and damping material 4 interposed therebetween. A portion of part 3 of the carrier plate, which is adjacent the friction material 5, projects laterally beyond the friction material 5 and has a pair of bores 6. The bores 6 provide a means for attaching the brake pad to a brake housing or caliper.

A plurality of calotte-shaped embossings 8 are formed on the outer part 2 of the carrier plate 1. Likewise, a plurality of calotte-shaped embossings 7 are formed on the inner part 3 of the carrier plate 1. The calotte-shaped embossings 7 and 8 in parts 3 and 2, respectively, are axially aligned. The part 3 is arranged so that the raised portion of the embossings 7 engage the friction material and the recessed portion of the embossings face part 2. Part 2 of the carrier plate 1 is arranged so that the raised portion of the embossings 8 are received in the recessed portion of the embossings 7 in part 3. In this manner the raised portions of the embossings 7 on part 3 project into the friction material 5 and help resist shear stress imparted to the friction material 5 during braking. Likewise, the nested relationship of the embossings 7 and 8 enable the carrier plate 1 to resist the shear stresses imparted to part 3 during braking.

Referring to FIG. 2, it can be seen that a thin bonding material 4 is inserted between and permanently bonded to parts 2 and 3 of the carrier plate 1. In this way, parts 2 and 3 are joined to form the carrier plate 1. The material 4 is slightly compressible, vibration-damping, heat-insulating, elastic and non-swellable.

A brake pad according to the instant invention can be manufactured as follows. Part 3 of the carrier plate 1 which is closest to the friction material 5 is constructed from a steel plate three millimeters thick. Part 2 of the carrier plate 1 is constructed from a steel plate 1.2 millimeters thick. Part 2 can also have the same length and width as part 3 and have bores coaxial with the bores 6 in part 3. A plurality of calotte-shaped, axially aligned embossings 7 and 8 are formed on parts 3 and 2, respectively. The embossings have oblique centering surfaces which are approximately eight millimeters in diameter and one millimeter in depth. After embossing the two metallic plates are degreased in the customary manner and an adhesive is put on both sides of part 3 and on the side of part 2 which faces part 3. A layer of cyclized rubber having a thickness of 0.15 millimeters is placed between the parts 2 and 3 of the carrier plate 1. The parts 2 and 3 of the carrier plate 1 are placed in a mold with the layer 4 therebetween. A friction lining composition 5 is then poured into the mold.

Subsequently, the pressing process is carried out at a pressure between 500 and 700 kp/cm$^2$ and at a temperature between 150° and 210° C. for a curing time of 2-12 minutes. This is done in a single press die and in a single step. The friction lining composition is shaped and formed to give the friction lining 5 and simultaneously the lining 5 is bonded to the carrier plate 1 and the bonding layer 4 is bonded to the parts 2 and 3 to produce the unitized carrier plate 1.

Using this method, it has been found that the bonding layer 4 is non-swellable, that is to say, non-flowable, and the material is not pressed out from between the parts 2 and 3 during the pressing operation. Further, it has been found that during the pressing operation, the projections and recesses of the calotte-shaped embossings 7 and 8 precisely center parts 2 and 3 and prevent relative displacement of the parts. It has also been found that the bonding material 4 not only forms a vibration-damping and heat-insulating layer, but is also forms a wall having a uniform thickness between the parts 2 and 3. In this manner, metal-to-metal contact of the parts 2 and 3 is prevented at all places including adjacent the calotte-shaped embossings, with the result that no bridges are formed which can transmit vibration or heat. Since the bonding material 4 is very thin, it has been found that using the aforementioned dimensions the projections and recesses of the embossings 7 and 8 adequately engage each other and reliably absorb the shear forces arising during braking, and that mutual displacement of the parts 2 and 3 is prevented.

In actual tests in which the brake pad was stressed by shearing forces which acted parallel to the contact surfaces, the shear forces reached 1870–2000 kp before failure. These forces are considerably higher than those customarily demanded by brake manufacturers and car manufacturers.

A variety of materials suitable for bonding layer 4 have been found. One suitable material is rubber-modified asbestos having a thickness of 0.5 millimeters. Another material is linen-fabric impregnated with synthetic latex and pre-dried, such as is employed as the raw material in the manufacture of fabric-based laminates. Another material is a rubber-modified epoxide resin film. This material gives extremely high shear values, e.g., on the order of 3000 kp.

It has also been found that the carrier plate 1 can be assembled utilizing three parts joined by two bonding layers 4.

Referring to FIG. 1, it is seen that part 2 of the carrier plate, i.e, the part which is contacted by the brake piston, is not as long as part 3. Moreover, it has been found desirable to make the width of part 2 one millimeter less than the width of the friction lining 5 and part 3. When this is done, part 2 does not extend to the two lateral edges of the brake pad which, during braking, lie against the brake housing. Consequently, part 2 does not come into contact with the brake housing and does not form a bridge by means of which vibrations and heat can be transferred from part 3 to the brake housing and brake piston via part 2.

It has also been found that embossings eight millimeters wide and one millimeter in depth can be formed in parts 2 and 3 of the carrier plate 1 in place of the calotte-shaped embossings 7 and 8 shown in FIGS. 1–3. One of the embossings is located parallel to the cut line II—II of FIG. 1 which is parallel to the two lateral edges of the brake pad. A third embossing is located in the middle of part 3 of the carrier plate 1 in the direction of the line III—III of FIG. 1. To obtain oblique centering surfaces like those present in the calotte-shaped embossings, the centering recesses and projections are spherically curved at their ends in the longitudinal direction and provided with a rounded cross-section in the transverse direction. This results in the same centering effect as in the calotte-shaped embossings.

From the above it can be seen that the calotte-shaped embossings provide centering recesses and projections with oblique centering surfaces which permit accurate alignment of the parts 2 and 3 of the carrier plate 1 and also permit an elastic bonding layer 4 having a uniform thickness. Consequently, the brake pad of the instant invention has a carrier plate 1 with a high shear strength but in which metal-to-metal contact of the shear plate parts is avoided, with the result that the shear plate parts are isolated from each other for excellent vibration damping and heat insulation.

What is claimed is:

1. A brake pad for disc brakes, in particular disc brakes of motor vehicles, comprising a multi-part carrier plate and a friction lining pressed thereon, a damping layer being provided in each case between two parts of the carrier plate to separate the two parts and projections on one part of the carrier plate engaging with corresponding recesses in the other part of the carrier plate, characterized in that the parts of the carrier plate are provided with mating centering recesses and centering projections which mutually engage and have oblique centering surfaces, a slightly compressible thin, vibration-damping and heat-insulating elastic bonding layer is located between two parts of the carrier plate and the elastic bonding layer consists of a non-swellable material which is bonded to the parts of the carrier plate under pressure and at the temperature at which the friction lining is bonded to the carrier plate.

2. A brake pad according to claim 1, characterized in that the peripheral dimensions of the part of the carrier plate which is in contact with the brake piston of the disc brake are smaller than those of the other part of the carrier plate so that it does not come into contact with the brake housing.

3. A brake pad according to claim 1, characterized in that the projections on said one part of the carrier plate engage said friction lining to help resist shear stress imparted to the friction material during braking.

* * * * *